(12) United States Patent
Wang et al.

(10) Patent No.: US 11,454,802 B2
(45) Date of Patent: Sep. 27, 2022

(54) LIGHT SOURCE MODULE, BACKLIGHT MODULE AND DISPLAY DEVICE

(71) Applicants: Beijing BOE Display Technology Co., Ltd., Beijing (CN); BOE Technology Group Co., Ltd., Beijing (CN)

(72) Inventors: Fei Wang, Beijing (CN); Xuan Liang, Beijing (CN); Wanxian Xu, Beijing (CN)

(73) Assignees: BEIJING BOE DISPLAY TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 427 days.

(21) Appl. No.: 16/457,232

(22) Filed: Jun. 28, 2019

(65) Prior Publication Data
US 2020/0033587 A1    Jan. 30, 2020

(30) Foreign Application Priority Data
Jul. 27, 2018   (CN) .......................... 201810846674.1

(51) Int. Cl.
*G02B 26/00* (2006.01)
*F21V 8/00* (2006.01)

(52) U.S. Cl.
CPC ............. *G02B 26/00* (2013.01); *G02B 6/005* (2013.01); *G02B 26/005* (2013.01)

(58) Field of Classification Search
None
See application file for complete search history.

(56) References Cited

U.S. PATENT DOCUMENTS 9,927,606 B1  3/2018 Sakai
10,288,254 B2  5/2019 Schaffer et al.
(Continued)

FOREIGN PATENT DOCUMENTS

CN    102955247 A    3/2013
CN    103354917 A    10/2013
(Continued)

OTHER PUBLICATIONS

First office action dated Apr. 1, 2020 for application No. CN201810846674.1 with English translation attached.
(Continued)

*Primary Examiner* — William R Alexander
*Assistant Examiner* — Tamara Y. Washington
(74) *Attorney, Agent, or Firm* — Nath, Goldberg & Meyer; Joshua B. Goldberg

(57) ABSTRACT

A light source module includes a light adjusting element including a first substrate, a second substrate and a fluid layer, the fluid layer includes polar fluid, the first substrate includes a light guide layer, a first electrode layer and a dielectric layer, the dielectric layer is in contact with the fluid layer, a refractivity of the dielectric layer is equal to that of the light guide layer, a refractivity of the polar fluid is greater than or equal to that of the dielectric layer, the light adjusting element incudes control regions corresponding to first electrodes included in the first electrode layer one by one, a second electrode layer is provided in the first or second substrate, a control electric field is formed between the first electrode and the second electrode layer to control hydrophilicity and hydrophobicity of the polar fluid on a surface of the dielectric layer.

12 Claims, 6 Drawing Sheets

(56) References Cited

U.S. PATENT DOCUMENTS

| | | | |
|---|---|---|---|
| 10,802,266 B1* | 10/2020 | Sakai | G02B 26/005 |
| 2010/0289870 A1 | 11/2010 | Leister | |
| 2013/0038922 A1 | 2/2013 | Kirita | |
| 2019/0204583 A1 | 7/2019 | Tan | |
| 2019/0310456 A1 | 10/2019 | Meng et al. | |
| 2021/0208387 A1* | 7/2021 | Karam | H04N 5/23287 |

FOREIGN PATENT DOCUMENTS

| | | | |
|---|---|---|---|
| CN | 106597658 A | 4/2017 | |
| CN | 107790203 A | 3/2018 | |
| CN | 108051915 A | 5/2018 | |

OTHER PUBLICATIONS

Chang, Yinxia "Research on the droplet movement in electrowetting on dielectric based ditigal microfluidic system", Dissertation submitted to Hebie Univerity of Technology, China, May 2012, with English translation.

\* cited by examiner

LIGHT SOURCE MODULE, BACKLIGHT MODULE AND DISPLAY DEVICE

CROSS-REFERENCE TO RELATED APPLICATIONS

The present application claims the priority of Chinese Patent Application No. 201810846674.1, filed on Jul. 27, 2018, and entitled "light source module, backlight module and display device", the contents of which are incorporated herein in their entirety by reference.

TECHNICAL FIELD

The present disclosure relates to the field of display technology, and in particular to a light source module, a backlight module and a display device.

BACKGROUND

Light source modules in the field of display technology are generally divided into two types including direct-lit light source modules and side-lit light source modules. The side-lit light source module generally includes a light guide plate and a light bar provided at a side of the light guide plate, since the light bar is provided at the side of the light guide plate, thus it is impossible to adjust a local brightness of a light exiting surface of the light source module. The direct-lit light source module generally includes a substrate and a plurality of light emitting chips arranged on the substrate, and a state of on/off and a current of each light emitting chip may be adjusted to adjust the local brightness of the light exiting surface of the light source module, but due to requiring a large number of light emitting chips, a relatively high cost is resulted in.

SUMMARY

An embodiment of the present disclosure provides a light source module, including a light emitting element and a light adjusting element, the light adjusting element includes a first substrate and a second substrate opposite to each other, an accommodation chamber is formed between the first substrate and the second substrate, a fluid layer is filled in the accommodation chamber, the fluid layer includes polar fluid and non-polar fluid which are immiscible, the first substrate includes a light guide layer, a first electrode layer and a dielectric layer, the light emitting element is provided at a side of the light guide layer, the first electrode layer is provide on a light exiting surface side of the light guide layer, the dielectric layer is provided on a side of the first electrode layer away from the light guide layer, the dielectric layer is in contact with the fluid layer, a refractivity of the dielectric layer is equal to a refractivity of the light guide layer, a refractivity of the polar fluid is greater than or equal to a refractivity of the dielectric layer, a refractivity of the non-polar fluid is less than the refractivity of the dielectric layer, the light adjusting element is divided into a plurality of control regions, the first electrode layer includes a plurality of first electrodes corresponding to the control regions one by one, a second electrode layer is provided in the first substrate or the second substrate, a control electric field is formed between the first electrode and the second electrode layer to control hydrophilicity and hydrophobicity of the polar fluid, in the control region corresponding to the first electrode, on a surface of the dielectric layer.

In some implementations, the second electrode layer is provided in the second substrate, and the second electrode layer includes a planar second electrode, the control electric field formed between the first electrode and the planar second electrode is a vertical electric field.

In some implementations, the second electrode layer is provided in the first substrate, the second electrode layer includes a plurality of second electrodes, and the control electric field formed between the first electrode and the second electrode corresponding thereto is a fringing electric field.

In some implementations, the first electrodes and the second electrodes are provided in a single layer.

In some implementations, the dielectric layer includes an insulation layer and a first hydrophobic layer, the insulation layer is provided on a side of the first electrode layer away from the light guide layer, and the first hydrophobic layer is provided on a side of the insulation layer away from the light guide layer.

In some implementations, the dielectric layer is of a single-layer structure, and a material of the dielectric layer includes an insulating and hydrophobic material.

In some implementations, a second hydrophobic layer is provided in the second substrate and in contact with the fluid layer, and a refractivity of the second hydrophobic layer is greater than the refractivity of the polar fluid.

In some implementations, the non-polar fluid includes air.

In some implementations, a fluid storage chamber is further formed between the first substrate and the second substrate, the fluid storage chamber is located outside the accommodation chamber and connected with the accommodation chamber, the first electrode layer further includes a third electrode corresponding to the fluid storage chamber, a control electric field is formed between the third electrode and the second electrode layer to control hydrophilicity and hydrophobicity of the polar fluid, in the fluid storage chamber, on a surface of the dielectric layer.

In some implementations, a refractivity of the first electrode is equal to the refractivity of the light guide layer.

An embodiment of the present disclosure further provides a backlight module including the light source module said above.

An embodiment of the present disclosure further provides a display device including the backlight module said above.

DESCRIPTION OF EMBODIMENTS

In order to make a person skilled in the art understand technical solutions of the present disclosure better, a light source module, a backlight module and a display device provided by the present disclosure will be described in detail below in conjunction with accompanying drawings and specific embodiments.

Figure 1:
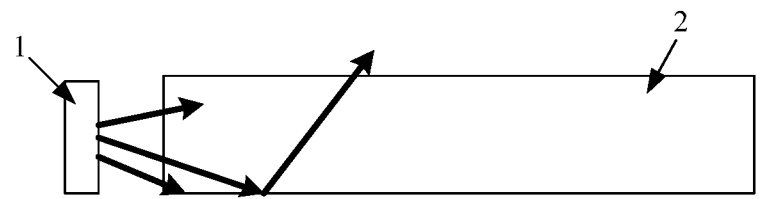
FIG. 1 shows a structural diagram of a side-lit light source module in related art.
Figure 2:
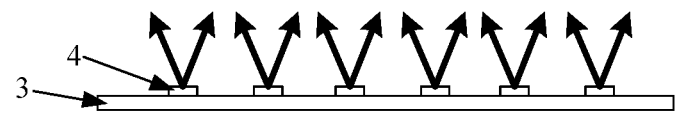
FIG. 2 shows a structural diagram of a direct-lit light source module in related art.

FIG. 1 shows a structural diagram of a side-lit light source module in related art, and FIG. 2 shows a direct-lit light source module in related art. As shown in FIG. 1, the side-lit light source module generally includes a light guide plate 2 and a light bar 1 provided at a side of the light guide plate 2, since the light bar 1 is provided at the side of the light guide plate 2, thus it is impossible to adjust a local brightness of a light exiting surface of the light source module. As shown in FIG. 2, the direct-lit light source module generally includes a substrate 3 and a plurality of light emitting chips 4 (e.g., LED chips) arranged on the substrate 3, and a state of on/off and a current of each light emitting chip 4 may be adjusted to adjust the local brightness of the light exiting surface of the light source module, but due to requiring a large number of light emitting chips 4, a relatively high cost is resulted in.

Figure 3A:
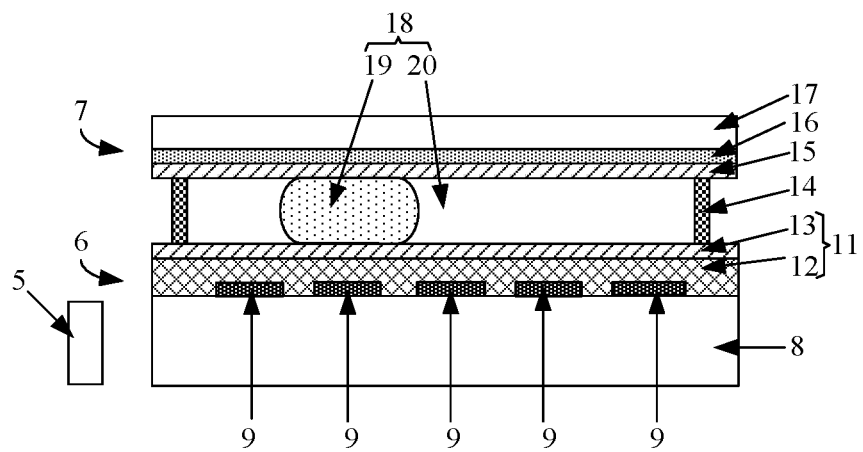
FIG. 3*a* shows a structural diagram of a light source module in an embodiment of the present disclosure.
Figure 3B:
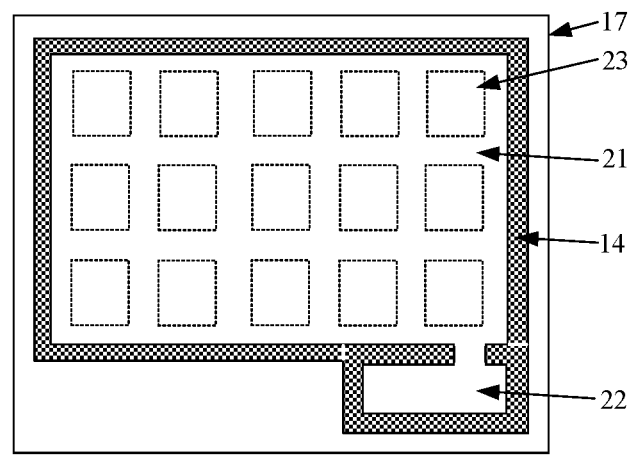
FIG. 3*b* shows a top view of the light source module shown in FIG. 3*a*.

FIG. 3a shows a structural diagram of a light source module in an embodiment of the present disclosure, and FIG. 3b shows a top view of the light source module shown in FIG. 3a. As shown in FIGS. 3a and 3b, the light source module includes a light emitting element 5 and a light adjusting element, the light adjusting element includes a first substrate 6 and a second substrate 7 opposite to each other, an accommodation chamber 21 is formed between the first substrate 6 and the second substrate 7, a fluid layer 18 is filled in the accommodation chamber 21, the fluid layer 18 includes polar fluid 19 and non-polar fluid 20 which are immiscible.

The first substrate 6 includes a light guide layer 8, a first electrode layer and a dielectric layer 11, the light emitting element 5 is provided at a side of the light guide layer 8, the first electrode layer is provide on a light exiting surface side of the light guide layer 8, the dielectric layer 11 is provided on a side of the first electrode layer away from the light guide layer 8, the dielectric layer 11 is in contact with the fluid layer 18, a refractivity of the dielectric layer 11 is equal to a refractivity of the light guide layer 8, a refractivity of the polar fluid 19 is greater than or equal to the refractivity of the dielectric layer 11, a refractivity of the non-polar fluid 20 is less than the refractivity of the dielectric layer 11.

The light adjusting element may be divided into a plurality of control regions 23, the first electrode layer includes a plurality of first electrodes 9 corresponding to the control regions 23 one to one, a second electrode layer is provided in the second substrate 7, a control electric field is formed between the first electrode 9 and the second electrode layer to control hydrophilicity and hydrophobicity of the polar fluid 19, in the control region 23 corresponding to the first electrode 9, on a surface of the dielectric layer 11.

In some implementations, a surrounding wall 14 may be formed between the first substrate 6 and the substrate 7, and the first substrate 6, the second substrate 7 and the surrounding wall 14 define a confined space as the accommodation chamber 21.

In some implementations, the non-polar fluid 20 includes air. Certainly, the non-polar fluid 20 may include other materials, which will not be enumerated one by one.

It should be noted that, the second substrate 7 may further include a base 17 for supporting the second electrode layer, a refractivity of the base 17 is greater than or equal to the refractivity of the second electrode layer. Certainly, in the embodiment, the base 17 is not necessary.

In the embodiment, the second electrode layer may include a planar second electrode 16, the control electric field formed between the first electrode 9 and the planar second electrode 16 is a vertical electric field, and a refractivity of the second electrode 16 is greater than or equal to the refractivity of the polar fluid 19.

A principle of light exiting of the light source module in an embodiment of the present disclosure will be described in detail below in conjunction with an accompanying drawing.

Figure 4:
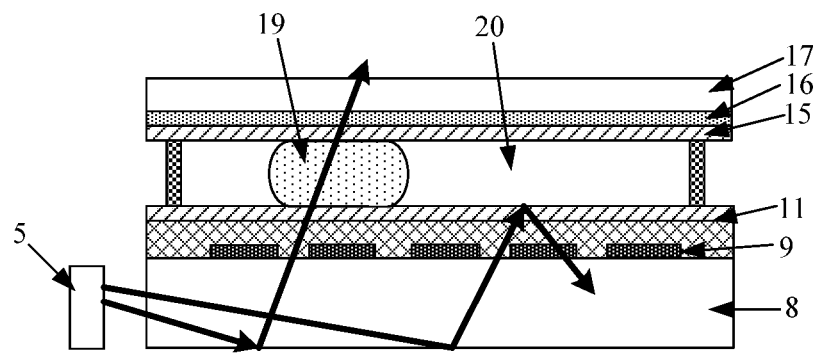
FIG. 4 shows a diagram of light path of the light source module shown in FIG. 3*a*.

FIG. 4 shows a diagram of light path of the light source module shown in FIG. 3a. As shown in FIG. 4, the light emitting element 5 generates and outputs light, and the light is incident into the light guide layer 8 through a side surface of the light guide layer 8 and is guided.

A portion of regions of the light exiting surface of the light guide layer 8 are in contact with the dielectric layer 11, and another portion of regions of the light exiting surface of the light guide layer 8 are in contact with the first electrodes 9. For the regions of the light guide layer 8 in contact with the dielectric layer 11, since the refractivity of the dielectric layer 11 is equal to the refractivity of the light guide layer 8, the light reaching at a surface of the light guide layer 8 in contact with the dielectric layer 11 penetrates through the surface of the light guide layer 8 and enters the dielectric layer 11. For the regions of the light guide layer 8 in contact with the first electrodes 9, if the refractivity of the first electrodes 9 is less than the refractivity of the light guide layer 8, at least a portion of light reaching at a surface of the light guide layer 8 in contact with the first electrodes 9 is reflected totally and cannot exit from the surface of the light guide layer 8; if the refractivity of the first electrodes 9 is equal to the refractivity of the light guide layer 8, the light reaching at the surface of the light guide layer 8 in contact with the first electrodes 9 penetrates through the surface of the light guide layer 8 and enters into the first electrodes 9, and then transmits into the dielectric layer 11; if the refractivity of the first electrodes 9 is greater than the refractivity of the light guide layer 8, the light reaching at the surface of the light guide layer 8 in contact with the first electrodes 9 is refracted and enters into the first electrodes 9, and then since the refractivity of the dielectric layer 11 (equal to the refractivity of the light guide layer 8) is less than the refractivity of the first electrodes 9, at least a portion of light reaching at a surface of the first electrodes 9 in contact with the dielectric layer 11 is reflected totally and cannot exit from the surface of the first electrodes 9.

It should be noted that, in the embodiment, it is only necessary to ensure that light can exit from the regions of the light guide layer 8 in contact with the dielectric layer 11, thus the refractivity of the first electrodes 9 is not limited in the embodiment. Certainly, in some implementations, the refractivity of the first electrodes 9 may be equal to the refractivity of the light guide layer 8, and in such case, light can exit from all regions of the light exiting surface of the light guide layer 8, thus a light exiting efficiency may be improved.

In a case where light reaches at a surface of the dielectric layer 11 in contact with the non-polar fluid 20, since the refractivity of the non-polar fluid 20 is less than the refractivity of the dielectric layer 11, at least a portion of the light is reflected totally and cannot exit from the surface of the dielectric layer 11; and in a case where light reaches at a surface of the dielectric layer 11 in contact with the polar fluid 19, since the refractivity of the polar fluid 19 is greater than or equal to the refractivity of the dielectric layer 11, the light exits from the surface of the dielectric layer 11 and enters the polar fluid 19. It should be noted that, in a case where the light in the polar fluid 19 reaches at a surface between the polar fluid 19 and the non-polar fluid 20, since the refractivity of the non-polar fluid 20 is less than the refractivity of the polar fluid 19, at least a portion of the light is reflected totally at the surface between the polar fluid 19 and the non-polar fluid 20.

In a case where the light in the polar fluid 19 reaches at a surface between the polar fluid 19 and the second electrode 16, since the refractivity of the second electrode 16 is greater than or equal to the refractivity of the polar fluid 19, the light penetrates the surface and enters the second electrode 16.

In a case where the light in the second electrode 16 reaches at a surface between the second electrode 16 and the base 17, since the refractivity of the base 17 is greater than or equal to the refractivity of the second electrode 16, the light penetrates through the surface and forms exiting light.

Based on the principle said above, the light source module of the embodiment can control exiting light of each control region 23. Specifically, a motion of the polar fluid 19 is controlled by the control electric field between the first electrode 9 and the second electrode 16, so that a distribution of the polar fluid 19 is controlled in the accommodation chamber 21, an amount of exiting light of the control region 23 with the polar fluid 19 is relatively large, and an amount of exiting light of the control region 23 (fully filled with the non-polar fluid 20) with no polar fluid 19 is relatively small, that is, the brightness of the control region 23 with the polar fluid 19 is relatively high, and the brightness of the control region 23 with no polar fluid 19 is relatively low. It can be seen that, a local brightness of a light exiting surface of the side-lit light source module of the embodiment can be adjusted.

Certainly, it should be understood that, in a case where all the light reaching at surfaces at which a total reflection may occur is reflected totally, no light exits from the control region 23 with no polar fluid 19, and the brightness of the control region 23 with no polar fluid 19 is the lowest.

A principle of controlling a motion of the polar fluid 19 by a control electric field between the first electrode 9 and the second electrode 16 in the embodiment will be described in detail below in conjunction with accompanying drawings.

Figure 5A:
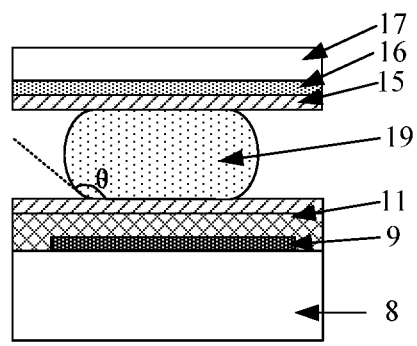
FIG. 5*a* shows a diagram in a case where the first electrode and the second electrode are applied with no voltage therebetween.
Figure 5B:
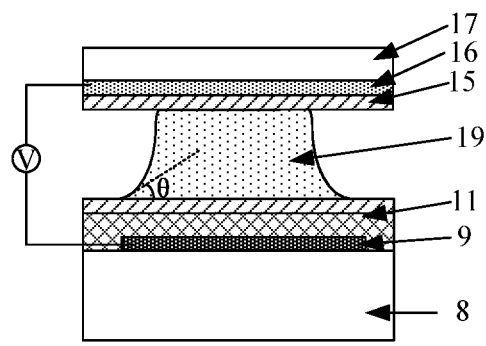
FIG. 5*b* shows a diagram in a case where the first electrode and the second electrode are applied with a voltage therebetween.

FIG. 5*a* shows a diagram in a case where no voltage is applied between the first electrodes 9 and the second electrode 16, and FIG. 5*b* shows a diagram in a case where the first electrodes and the second electrode 16 are applied with a voltage therebetween. As shown in FIGS. 5*a* and 5*b*, ignoring effects of gravity, in a case where the first electrodes 9 and the second electrode 16 are applied with no voltage, a surface tension between the polar fluid 19 and the dielectric layer 11 is relatively large, a contact angle θ between the polar fluid 19 and the dielectric layer 11 is an obtuse angle; in a case where the first electrodes and the second electrode 16 are applied with a voltage (i.e., a voltage difference V exists between the first electrodes 9 and the second electrode 16) therebetween, a control electric field (vertical electric field) may be formed between the first electrodes 9 and the second electrode 16, and under the control electric field, based on an electro-wetting effect, the polar fluid 19 exhibits hydrophilicity on a surface of dielectric layer 11, the surface tension between the polar fluid 19 and the dielectric layer 11 is reduced, the contact angle θ between the polar fluid 19 and the dielectric layer 11 is reduced and finally becomes an acute angle. The larger the voltage difference V between the first electrodes 9 and the second electrode 16 is, the greater the intensity of the control electric field formed is, and the smaller the contact angle θ between the polar fluid 19 and the dielectric layer 11 is.

Figure 6:
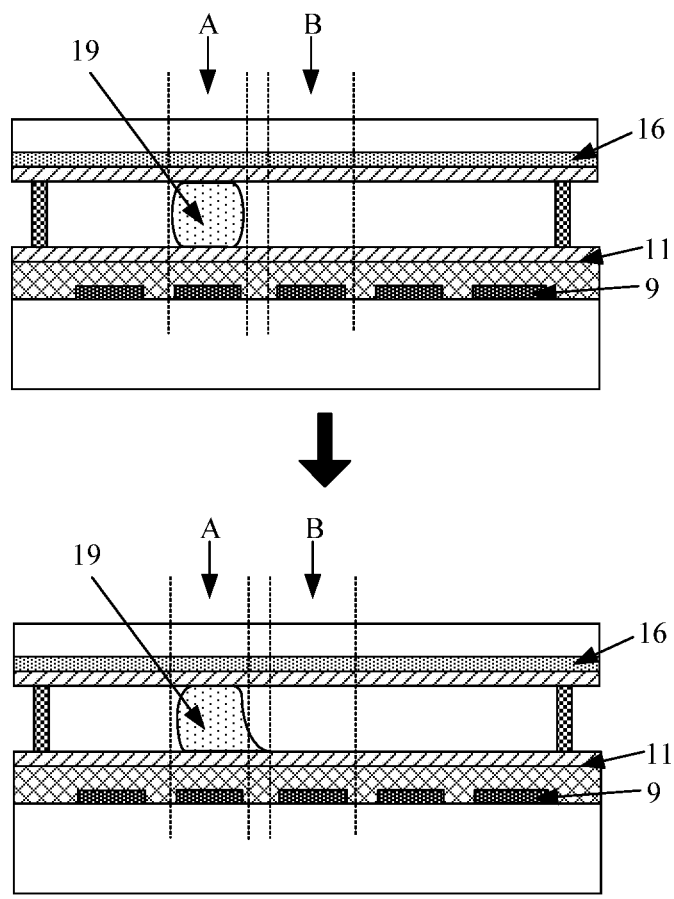
FIG. 6 shows a diagram of principle for controlling of motion of polar fluid by a control electric field in an embodiment of the present disclosure.

FIG. 6 shows a diagram of principle for controlling of motion of polar fluid 19 by a control electric field in the embodiment. As shown in FIG. 6, by taking controlling the polar fluid 19 to move from the control region A to the control region B as example, assuming that no control electric field is formed in both the control regions A and B in an initial state, and the polar fluid 19 is located in the control region A. In order to control the polar fluid 19 to move to the control region B, a preset voltage may be applied between the first electrode 9 corresponding to the control region B and the second electrode 16, so that a control electric field is formed in the control region B, in such case, a portion of the polar fluid 19 close to the control region B exhibits hydrophilicity and the contact angle between this portion of the polar fluid 19 and the dielectric layer 11 is reduced, resulting in an asymmetric deformation of the polar fluid 19, which causes an internal pressure difference of the polar fluid 19, thus the polar fluid 19 moves to the control region B entirely.

Based on the principle said above, the polar fluid 19 may be controlled to move by the control electric field formed between the first electrodes 9 and the second electrode 16, the distribution of the polar fluid 19 in the light adjusting element may be controlled, thereby the light exiting from the control regions 23 of the light adjusting element may be controlled.

In addition, the brightness of the control region 23 is further relating to a contact area between the polar fluid 19 and the dielectric layer 11 in the control region 23, and the larger the contact area between the polar fluid 19 and the dielectric 11 in the control region 23 is, the greater the amount of light exiting from the control region 23 is, thus the greater the brightness of the control region 23 is. Therefore, in the embodiment, the brightness of the control region 23 may be further controlled by controlling the contact area between the polar fluid 19 and the dielectric layer 11 in the control region 23.

Specifically, the contact area between the polar fluid 19 and the dielectric layer 11 in the control region 23 may be controlled by controlling a volume of the polar fluid 19, and hydrophilicity and hydrophobicity of the polar fluid 19 at the surface of the dielectric layer 11 in the control region 23.

In the embodiment, the volume of the polar fluid 19 may be controlled by controlling merging or separation of the polar fluid 19, which will be described in detail below in conjunction with accompanying drawings.

Figure 7:
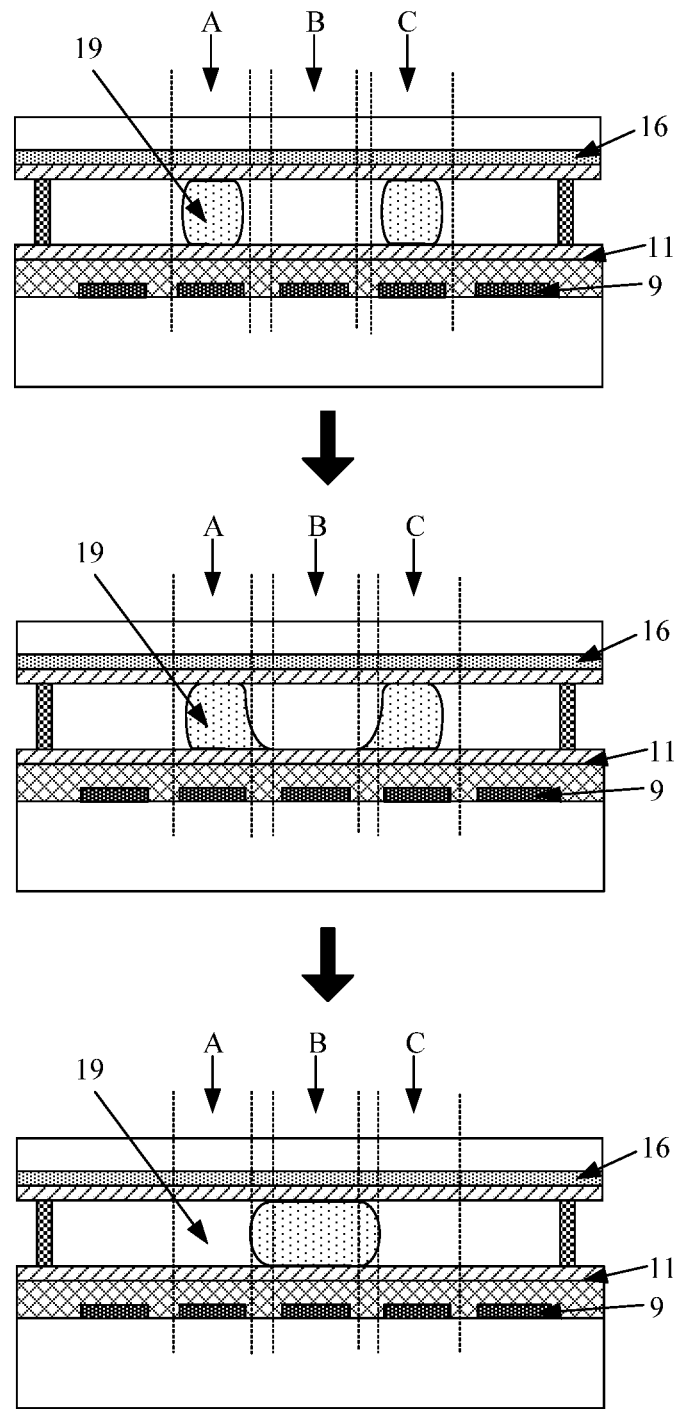
FIG. 7 shows a diagram of principle for controlling merging of polar fluid by a control electric field in an embodiment of the present disclosure.

FIG. 7 shows a diagram of principle for controlling merging of the polar fluid 19 by a control electric field in the embodiment. As shown in FIG. 7, assuming that no control electric field is formed in the control regions A, B and C in an initial state and the polar fluid 19 is located in each of the control regions A and C, in order to control the polar fluid 19 in the control region A and the polar fluid 19 in the control region C to merge together, a preset voltage may be applied between the first electrode 9 corresponding to the control region B and the second electrode 16 to form a control electric field in the control region B, and based on the principle of controlling a motion of the polar fluid 19 said above, the polar fluid 19 in the control region A and the polar fluid 19 in the control region C both move to the control region B and are merged in the control region B, thereby the volume of the polar fluid 19 is increased.

After merging of the polar fluid 19, the merged polar fluid 19 may be further moved to a target control region by controlling of the control electric field.

Figure 8:
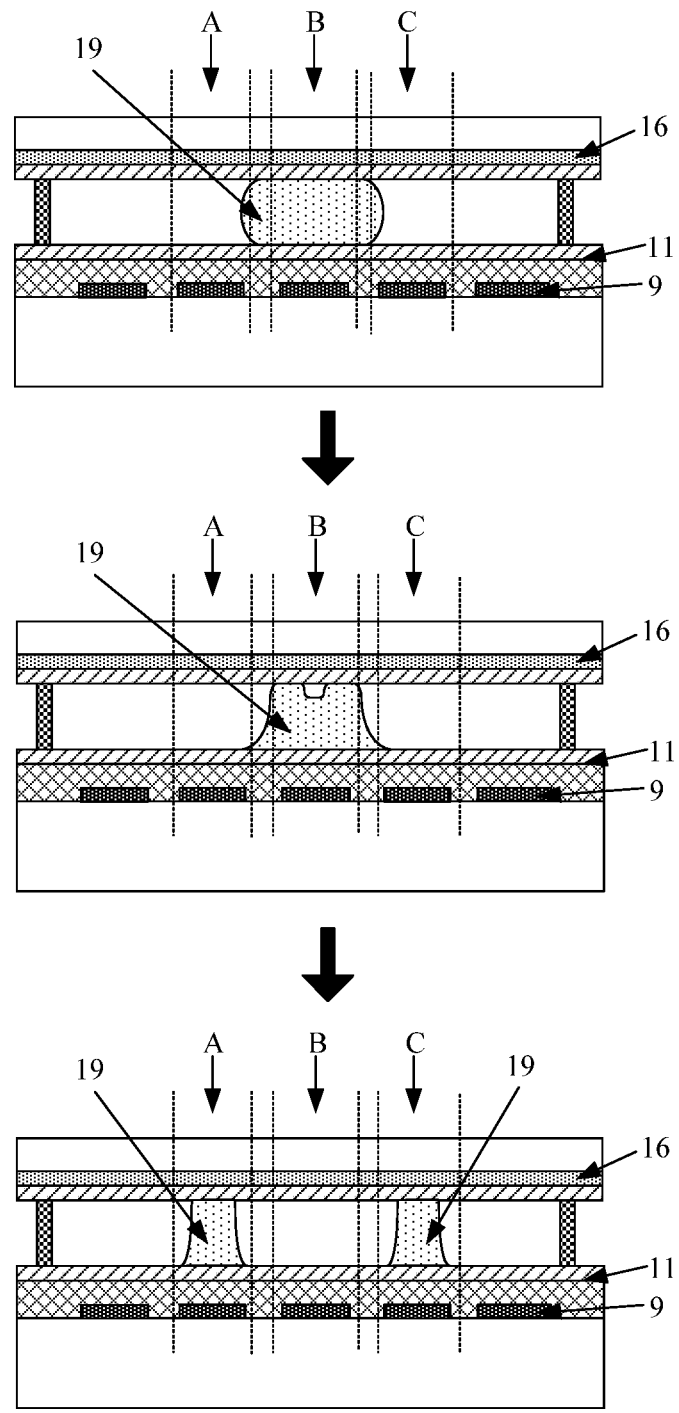
FIG. 8 shows a diagram of principle for controlling separation of polar fluid by a control electric field in an embodiment of the present disclosure.

FIG. 8 shows a diagram of principle for controlling separation of the polar fluid 19 by the control electric field in the embodiment. As shown in FIG. 8, assuming that no control electric field is formed in the control regions A, B and C in an initial state and the polar fluid 19 is located in the control region B, in order to control the polar fluid 19 in the control region B to be separated, a preset voltage may be applied between the first electrodes 9 corresponding to the control regions A and C and the second electrode 16 to form a control electric field in each of the control regions A and C, in such case, the portion of the polar fluid 19 in the control region B close to the control region A moves to the control region A, and the portion of the polar fluid 19 in the control region B close to the control region C moves to the control region C, a height of the polar fluid 19 in the control region B is reduced gradually until the polar fluid 9 is separated into two parts, thereby the polar fluid 19 is separated.

After separating of the polar fluid 19, the polar fluid 19 separated may be further controlled to move to a target control region by using the control electric field.

In the embodiment, in a case where the volume of the polar fluid 19 is constant, the contact area between the polar fluid 19 and the dielectric layer 11 may be controlled by controlling hydrophilicity of the polar fluid 19 on a surface of the dielectric layer 11.

As shown in FIGS. 5*a* and 5*b*, in a case where no voltage is applied to the first electrodes 9 and the second electrode 16, the surface tension between the polar fluid 19 and the dielectric layer 11 is relatively large, and the contact angle between the polar fluid 19 and the dielectric layer 11 is an obtuse angle, and the contact area between the polar fluid 19 and the dielectric layer 11 is S1; in a case where a voltage is applied between the first electrodes 9 and the second electrode 16, under controlling of the control electric field, based on the electro-wetting effect, the polar fluid 19 exhibits hydrophilicity on a surface of dielectric layer 11, the surface tension between the polar fluid 19 and the dielectric layer 11 is reduced, the contact angle between the polar fluid 19 and the dielectric layer 11 is reduced and finally becomes an acute angle, the contact area between the polar fluid 19 and the dielectric layer 11 is increased to be S2, and a size of the contact area S2 may be determined by a voltage difference between the first electrodes 9 and the second electrode 16.

It can be seen from the context above, the brightness of each control region 23 of the light source module in the embodiment may be adjusted, that is, a local brightness of a light exiting surface of the light source module in the embodiment may be adjusted.

In some implementations, as shown in FIG. 3*a*, the dielectric layer 11 may include an insulation layer 12 and a first hydrophobic layer 13, the insulation layer 12 is provided on a side of the first electrode layer away from the light guide layer 8, and the first hydrophobic layer 13 is provided on a side of the insulation layer 12 away from the light guide layer 8. The refractivity of each of the insulation layer 12 and the first hydrophobic layer 13 may be equal to the refractivity of the light guide layer 8.

Figure 9:
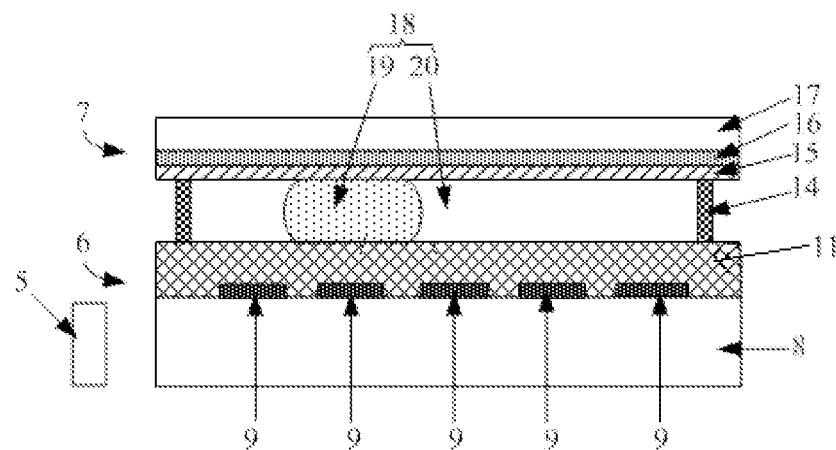
FIG. 9 shows a structural diagram of a light source module in an embodiment of the present disclosure.

In some implementations, as shown in FIG. 9, the dielectric layer 11 may be of a single-layer structure, and a material of the dielectric layer 11 may include an insulating and hydrophobic material (e.g., teflon).

In some implementations, the second substrate 7 may further include a second hydrophobic layer 15, and the second hydrophobic layer 15 is provided on a side of the second electrode layer close to the fluid layer 18, and in contact with the fluid layer 18, a refractivity of the second hydrophobic layer 15 is greater than or equal to the refractivity of the polar fluid 19 so that the light exiting from the polar fluid 19 can enter the second hydrophobic layer 15. In the embodiment, the second hydrophobic layer 15 can ensure smoothness and stability of the fluid layer 18 (polar fluid 19 and non-polar fluid 20) during moving.

Figure 10:
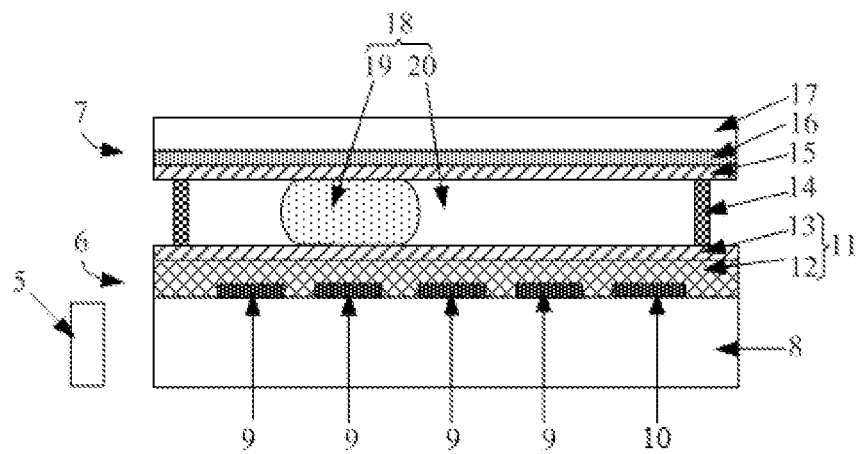
FIG. 10 shows a structural diagram of a light source module in an embodiment of the present disclosure.

As shown in FIG. 3*b*, in some implementations, a fluid storage chamber 22 is further formed between the first substrate 6 and the second substrate 7, the fluid storage chamber 22 is located outside the accommodation chamber 21 and communicated with the accommodation chamber 21. In such case, as shown in FIG. 10, the first electrode layer may further include a third electrode 10 corresponding to the fluid storage chamber 22, a control electric field is formed between the third electrode 10 and the second electrode layer to control hydrophilicity and hydrophobicity of the polar fluid 19, in the fluid storage chamber 22, on a surface of the dielectric layer 11. In the embodiment, the polar fluid 19 may be controlled to enter or exit the fluid storage chamber 22 by the control electric field between the first electrodes 9 and the second electrode layer, and the control electric field between the third electrode 10 and the second electrode layer. The specific controlling procedure will not be repeated here.

Figure 11:
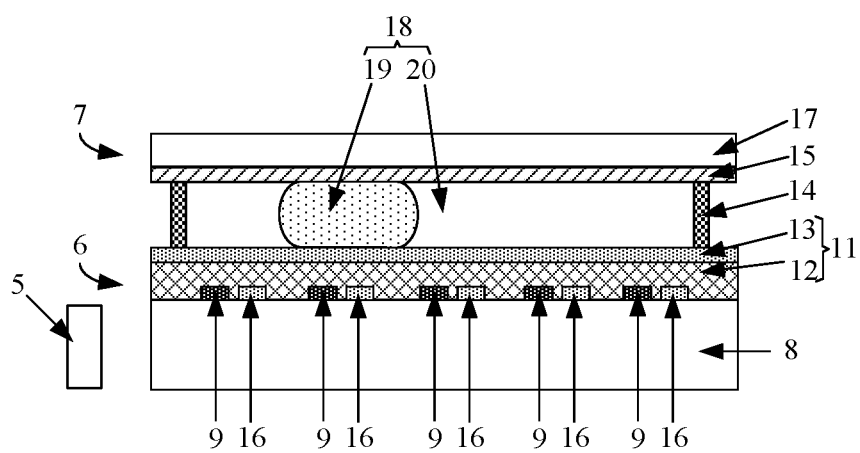
FIG. 11 shows a structural diagram of a light source module in an embodiment of the present disclosure.

FIG. 11 shows a structural diagram of another light source module in an embodiment of the present disclosure. As shown in FIG. 11, different from the light source module in the above embodiment, the second electrode layer in this embodiment is provided in the first substrate 6, the second electrode layer includes a plurality of second electrodes 16, a fringe electric field is formed between the first electrode 9 in the first electrode layer and the second electrode 16 corresponding thereto, as the control electric field. In the light source module of the embodiment, the principle of adjusting the local brightness of the light exiting surface of the light source module by controlling the fringe electric field between the first electrode 9 and the second electrode 16 corresponding thereto is the same as that in the above embodiment, thus will not be repeated here.

In the embodiment, the first electrodes 9 and the second electrodes 16 may be provided in a single layer. In such case, the first electrodes 9 and the second electrodes 16 may be formed simultaneously by a single patterning process, processes will be reduced effectively. In a case where the first electrode layer of the embodiment further includes the third electrode 10, the first electrodes 9, the second electrodes 16 and the third electrode 10 may be provided in a single layer, and the first electrodes 9, the second electrodes 16 and the third electrode 10 may be formed simultaneously by a single patterning process. Certainly, the first electrodes 9 and the second electrodes 16 being provided in a single layer is only an example, which is not intended to limit to the embodiment. In the embodiment, the first electrodes 9 and the second electrodes 16 may be provided in different layers, as long as the fringe electric field formed between the first electrode 9 and the second electrode 16 corresponding thereto can cover the control region 23 corresponding to the first electrode 9.

For descriptions of structures other than the first and second electrode layers in the embodiment, reference can be made to the contents of the above-mentioned embodiment, which will not be repeated here.

An embodiment of the present disclosure further provides a backlight module including the light source module said above, specific contents may be referred to those in the above-mentioned embodiment, and will not be repeated here.

An embodiment of the present disclosure further provides a display device including the backlight module said above. The display device may be any structure or equipment for displaying, such as a liquid crystal display, a navigator and a mobile phone.

It should be noted that, the light source modules of embodiments of the present disclosure can be used not only as, for example, a backlight in a liquid crystal display device, but also as a lighting device.

It should be understood that, the above embodiments are merely exemplary embodiments for explaining principle of the present disclosure, but the present disclosure is not limited thereto. Various modifications and improvements may be made by those ordinary skilled in the art within the spirit and essence of the present disclosure, these modifications and improvements fall into the protection scope of the present disclosure.

The invention claimed is:

1. A light source module, comprising a light emitting element and a light adjusting element, the light adjusting element comprises a first substrate and a second substrate opposite to each other, an accommodation chamber is formed between the first substrate and the second substrate, a fluid layer is filled in the accommodation chamber, the fluid layer comprises polar fluid and non-polar fluid which are immiscible, the first substrate comprises a light guide layer, a first electrode layer and a dielectric layer, the light emitting element is provided at a side of the light guide layer, the first electrode layer is provide on a light exiting surface side of the light guide layer, the dielectric layer is provided on a side of the first electrode layer away from the light guide layer, the dielectric layer is in contact with the fluid layer, a refractivity of the dielectric layer is equal to a refractivity of the light guide layer, a refractivity of the polar fluid is greater than or equal to the refractivity of the dielectric layer, a refractivity of the non-polar fluid is less than the refractivity of the dielectric layer, the light adjusting element is divided into a plurality of control regions, the first electrode layer comprises a plurality of first electrodes corresponding to the control regions one to one, a second electrode layer is provided in the first substrate or the second substrate, a control electric field is formed between the first electrode and the second electrode layer to control hydrophilicity and hydrophobicity of the polar fluid, in the control region corresponding to the first electrode, on a surface of the dielectric layer.

2. The light source module of claim 1, wherein the second electrode layer is provided in the second substrate, and the second electrode layer includes a planar second electrode, the control electric field formed between the first electrode and the planar second electrode is a vertical electric field.

3. The light source module of claim 1, wherein the second electrode layer is provided in the first substrate, the second electrode layer comprises a plurality of second electrodes, and the control electric field formed between the first electrode and the second electrode corresponding thereto is a fringing electric field.

4. The light source module of claim 3, wherein the first electrodes and the second electrodes are provided in a single layer.

5. The light source module of claim 1, wherein the dielectric layer comprises an insulation layer and a first hydrophobic layer, the insulation layer is provided on a side of the first electrode layer away from the light guide layer, and the first hydrophobic layer is provided on a side of the insulation layer away from the light guide layer.

6. The light source module of claim 1, wherein the dielectric layer is of a single-layer structure, and a material of the dielectric layer comprises an insulating and hydrophobic material.

7. The light source module of claim 1, wherein a second hydrophobic layer is provided in the second substrate and in contact with the fluid layer, and a refractivity of the second hydrophobic layer is greater than or equal to the refractivity of the polar fluid.

8. The light source module of claim 1, wherein the non-polar fluid comprises air.

9. The light source module of claim 1, wherein a fluid storage chamber is further formed between the first substrate and the second substrate, the fluid storage chamber is located outside the accommodation chamber and communicated with the accommodation chamber, the first electrode layer further comprises a third electrode corresponding to the fluid storage chamber, a control electric field is formed between the third electrode and the second electrode layer to control hydrophilicity and hydrophobicity of the polar fluid, in the fluid storage chamber, on a surface of the dielectric layer.

10. The light source module of claim 1, wherein a refractivity of the first electrode is equal to the refractivity of the light guide layer.

11. A backlight module, comprising the light source module of claim 1.

12. A display device, comprising the backlight module of claim 11.

* * * * *